(12) United States Patent
Swann et al.

(10) Patent No.: US 6,206,412 B1
(45) Date of Patent: Mar. 27, 2001

(54) INFLATOR ASSEMBLY FOR A VEHICLE OCCUPANT PROTECTION DEVICE

(75) Inventors: Timothy A. Swann; Bryan W. Shirk; Roy D. Van Wynsberghe, all of Mesa, AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/456,088

(22) Filed: Dec. 6, 1999

(51) Int. Cl.⁷ .............................. B60R 21/22; B60R 21/26
(52) U.S. Cl. ..................... 280/730.2; 280/736; 102/530
(58) Field of Search ............... 280/743.1, 728.1, 280/736, 741, 737; 102/530, 531

(56) References Cited

U.S. PATENT DOCUMENTS

| 3,764,160 | | 10/1973 | Fiala . | |
|---|---|---|---|---|
| 4,034,497 | * | 7/1977 | Yanda .................................. | 102/530 |
| 4,275,901 | * | 6/1981 | Okada .................................. | 280/741 |
| 4,600,123 | * | 7/1986 | Galbraith ............................. | 102/530 |
| 5,348,344 | * | 9/1994 | Blumenthal et al. ................ | 280/741 |
| 5,372,380 | * | 12/1994 | Duffy et al. ....................... | 280/728.1 |
| 5,593,180 | | 1/1997 | Cuevas et al. . | |
| 5,924,723 | * | 7/1999 | Brantman et al. ................ | 280/730.2 |
| 5,979,936 | * | 11/1999 | Moore et al. ....................... | 280/736 |
| 6,039,347 | * | 3/2000 | Maynard ............................ | 280/736 |
| 6,052,071 | * | 4/2000 | Crowley et al. . | |
| 6,095,551 | * | 8/2000 | O'Docherty ....................... | 280/730.2 |

\* cited by examiner

Primary Examiner—Lanna Mai
Assistant Examiner—Lynda Jasmin
(74) Attorney, Agent, or Firm—Tarolli, Sundheim, Covell, Tummino & Szabo L.L.P.

(57) ABSTRACT

An apparatus (10) for helping to protect an occupant of a vehicle (12) comprises a vehicle occupant protection device (14) that is inflatable between a part (16) of the vehicle and a vehicle occupant. The apparatus (10) also comprises an inflation fluid source (24) that is actuatable to direct into the vehicle occupant protection device (14) both gas for initially inflating the vehicle occupant protection device and materials (82, 124) for forming a low-density closed cell foam material in the vehicle occupant protection device. The closed cell foam material assists in maintaining the vehicle occupant protection device (14) in an inflated condition.

9 Claims, 2 Drawing Sheets

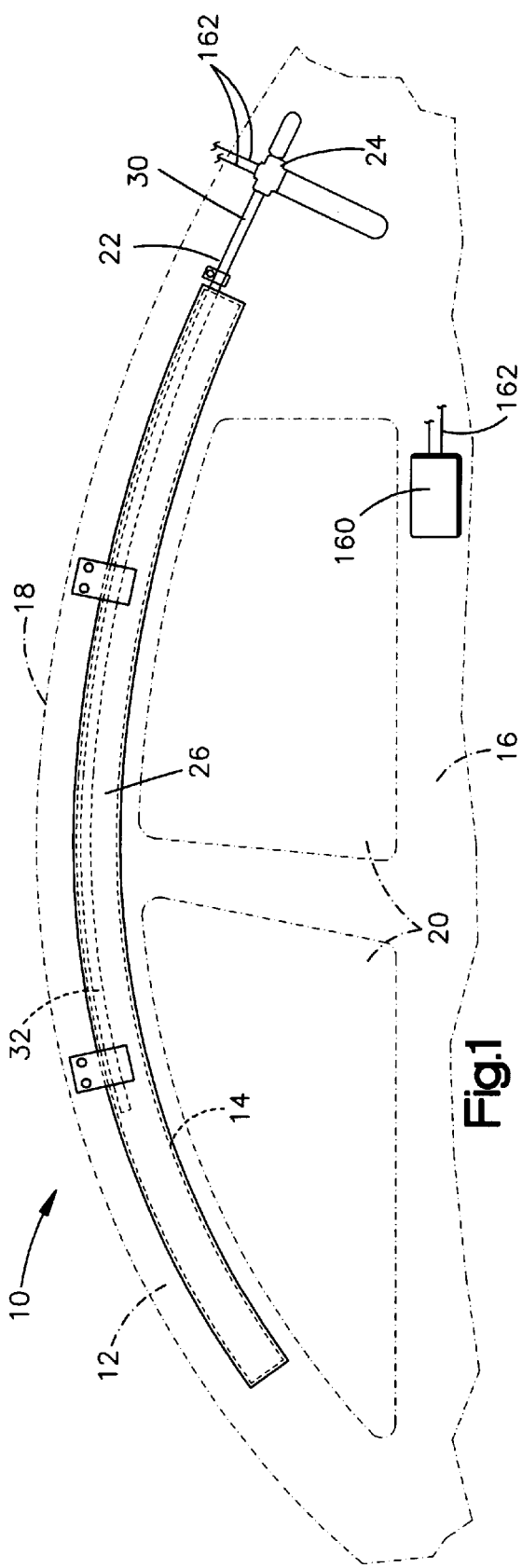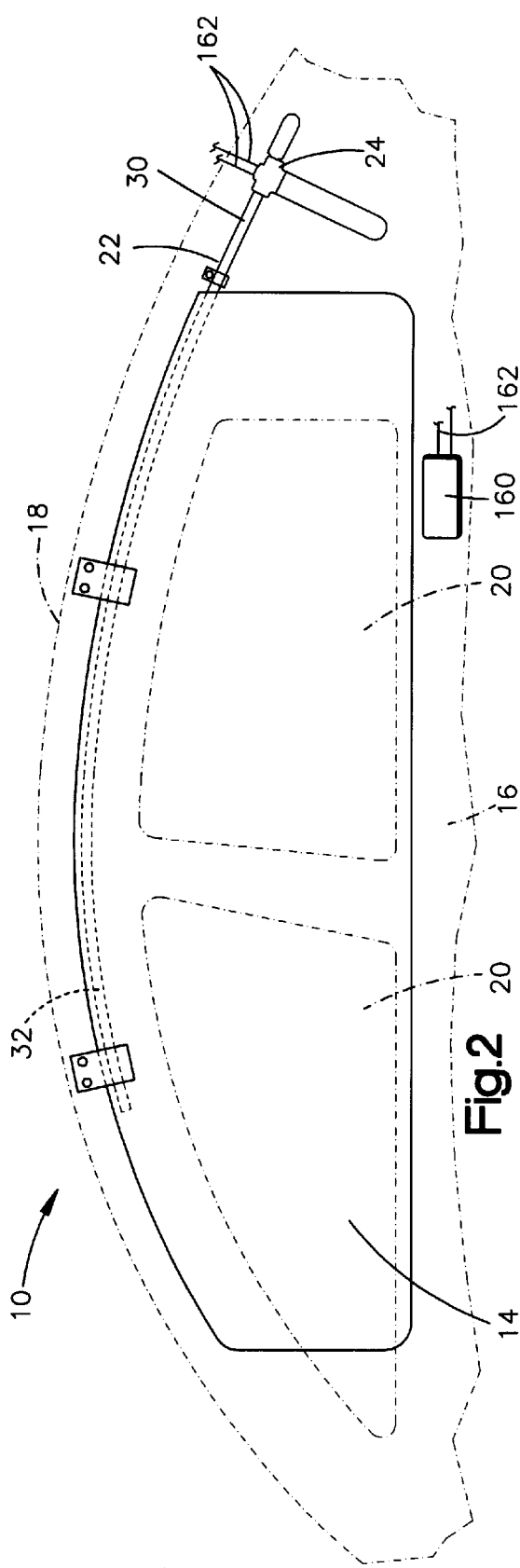

INFLATOR ASSEMBLY FOR A VEHICLE OCCUPANT PROTECTION DEVICE

FIELD OF THE INVENTION

The present invention relates to a vehicle safety apparatus and, in particular, to an inflator for an inflatable vehicle occupant protection device, such as an inflatable curtain.

BACKGROUND OF THE INVENTION

It is known to inflate a vehicle occupant protection device to help protect a vehicle occupant. The vehicle occupant protection device is inflated by inflation fluid from an inflator. One particular type of vehicle occupant protection device is an inflatable curtain that is inflatable into a position between the vehicle occupant and the side structure of the vehicle to help protect the vehicle occupant in the event of a side impact to the vehicle and/or a vehicle rollover. It may be desirable for the inflatable curtain to remain inflated for an extended period of time.

SUMMARY OF THE INVENTION

The present invention is an apparatus for helping to protect an occupant of a vehicle. The apparatus comprises a vehicle occupant protection device that is inflatable between a part of the vehicle and a vehicle occupant. The safety apparatus also comprises an inflation fluid source that is actuatable to direct into the vehicle occupant protection device both gas for initially inflating the vehicle occupant protection device and materials for forming a low-density closed cell foam material in the vehicle occupant protection device. The closed cell foam material assists in maintaining the vehicle occupant protection device in an inflated condition.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of a vehicle safety apparatus in a deflated condition according to the present invention;

FIG. 2 is a schematic view of the vehicle safety apparatus of FIG. 1 in an inflated condition.

DESCRIPTION OF PREFERRED EMBODIMENTS

Figure 3:
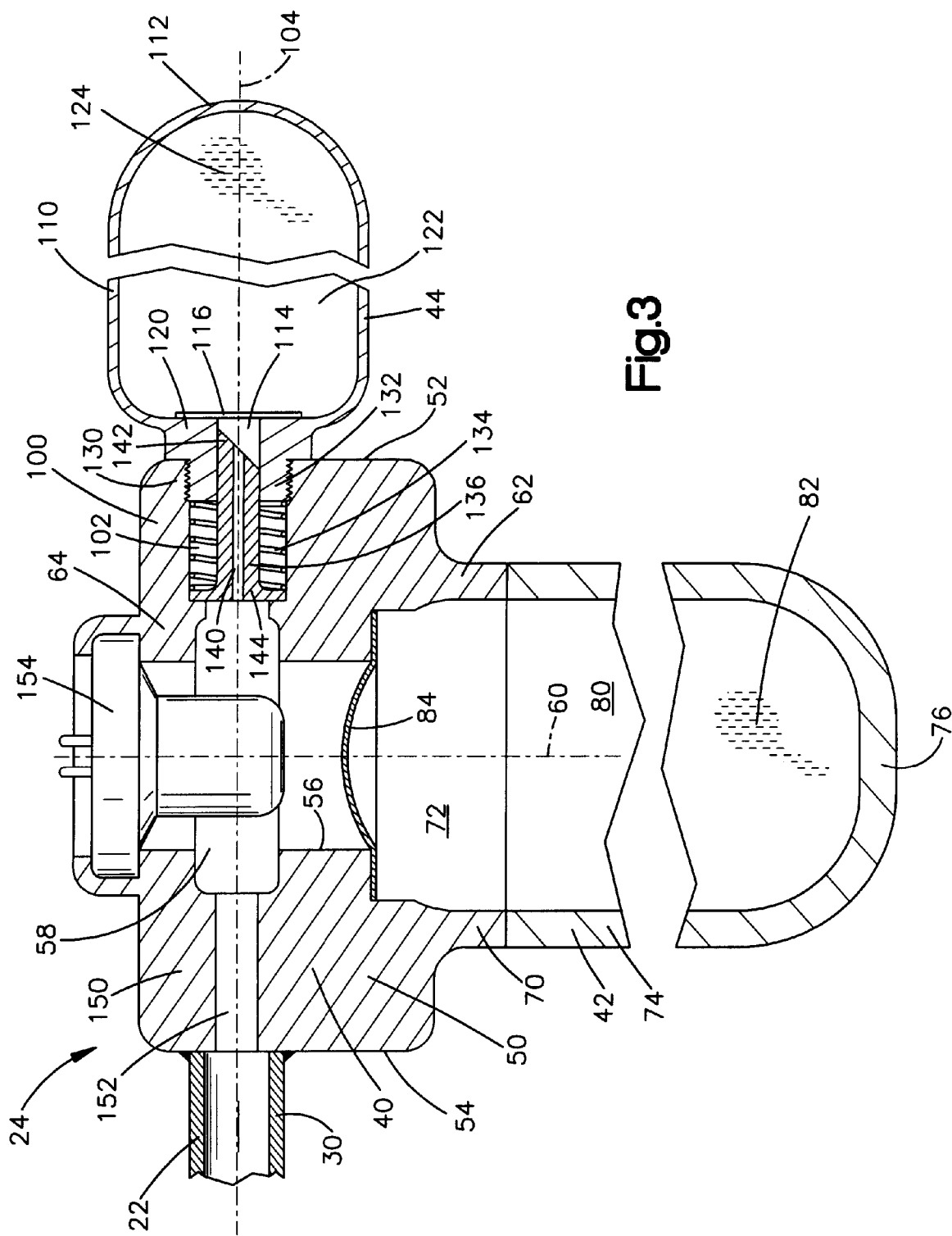
FIG. 3 is a sectional view of an inflator assembly that forms a part of the vehicle safety apparatus of FIG. 1.

As representative of the present invention, a vehicle safety apparatus 10 helps to protect an occupant of a vehicle 12. As shown in FIGS. 1 and 2, the safety apparatus 10 includes a vehicle occupant protection device in the form of an inflatable curtain 14 that is mounted adjacent to a side structure 16 and a roof 18 of the vehicle 12. The side structure 16 of the vehicle 12 includes side windows 20. An inflation fluid source comprises an inflator assembly 24 that is connected in fluid communication with the inflatable curtain 14 through a fill tube 22.

The fill tube 22 has a first end portion 30 for receiving fluid from the inflator assembly 24. The fill tube 22 has a second end portion 32 disposed in the inflatable curtain 14. The fill tube 22 has a plurality of openings (not shown) that provide fluid communication between the fill tube and the inflatable curtain 14. It will be recognized by those skilled in the art, however, that the vehicle safety apparatus 10 may have alternative configurations. For example, the fill tube 22 may be omitted and the inflator assembly 24 may be connected directly to the inflatable curtain 14.

The inflator assembly 24 may have a variety of configurations. As representative of the present invention, the inflator assembly 24 is illustrated in FIG. 3. The inflator assembly 24 includes a housing 40, a first vessel 42, and a second vessel 44.

The housing 40 includes a body 50 having first and second end surfaces 52 and 54, respectively. An inner surface 56 of the housing 40 defines a central chamber 58 in the housing. The body 50 is centered on an axis 60 and has a first end 62 and an opposite second end 64. The first and second ends 62 and 64 are spaced apart along the axis 60.

The body 50 includes a first wall portion 70 located at the first end 62 of the housing. The first wall portion 70 defines a first chamber portion 72 that is centered on the axis 60 and extends from the first end 62 of the body 50 to the central chamber 58. The first vessel 42 is connected to the first wall portion 70 and is also centered on the axis 60. The first chamber portion 72 is in fluid communication with a chamber of the first vessel 42. The first vessel 42 is secured to the first wall portion 70 of the housing 40 by a weld, but could alternatively be secured by other known techniques, such as brazing or screw threads. The first vessel 42 includes an axially extending, cylindrical side wall 74 and a domed end wall 76.

The first vessel 42 and the first chamber portion 72 define a first fluid storage chamber 80. The first fluid storage chamber 80 contains a quantity of a first inflation fluid 82 that comprises a combination of a pressurized volume of a gas and a foaming agent material. A rupturable burst disk 84 is secured to the body 50 and blocks flow of the first inflation fluid 82 out of the first fluid storage chamber 80.

The body 50 includes a portion 100 (shown on the right side of FIG. 3). The portion 100 includes an inlet passage 102 that is centered on a lateral axis 104 of the housing 40, which extends perpendicular to the axis 60. The inlet passage 102 extends from the first end surface 52 of the body 50 to the central chamber 58. The second vessel 44 is connected to the portion 100 and is centered on the lateral axis 104. The inlet passage 102 provides fluid communication between the second vessel 44 and the central chamber 58. The second vessel 44 is secured to the portion 100 of the body 50 by screw threads, but could alternatively be secured by other known techniques, such as welding or brazing. The second vessel 44 has an axially extending, cylindrical side wall 110 and a domed end wall 112.

The second vessel 44 has a central opening 114 in fluid communication with the inlet passage 102. A rupturable portion 116 of the second vessel 44, such as a burst disk or foil membrane, is secured to an inner end portion 120 of the second vessel 44. The rupturable portion 116 closes the second vessel 44, forming a second fluid storage chamber 122 defined by the side wall 110, the end wall 112 and the rupturable portion 116. The second fluid storage chamber 122 contains a quantity of a second inflation fluid 124 that comprises a combination of a pressurized volume of a gas and a foam reactant material. The rupturable portion 116 blocks flow of the second inflation fluid 124 out of the second fluid storage chamber 122 through the central opening 114 of the second vessel 44.

The inlet passage 102 includes a threaded portion 130 that receives a threaded end portion 132 of the second vessel 44.

The threaded end portion 132 of the second vessel 44 is screwed into the threaded portion 130 of the inlet passage 102. The threaded end portion 132 retains a spring 134 and a needle 136 in the inlet passage 102 when the second vessel 44 is screwed into the threaded portion 130.

The needle 136 is hollow and includes an inflation fluid passage 140, which extends through the entire length of the needle 136. The needle 136 has a sharpened end portion 142 disposed in the central opening 114 of the second vessel 44, adjacent to the rupturable portion 116 of the second vessel. The needle 136 has an inner end portion 144 exposed to the fluid pressure in the central chamber 58 of the housing 40. The spring 134 biases the needle 136, against the fluid pressure in the central chamber 58, into a position such that the sharpened end portion 142 of the needle is spaced apart from the rupturable portion 116 of the second vessel 44.

The body 50 also includes an outlet portion 150. The outlet portion 150 is located along the lateral axis 104 and is spaced opposite the portion 100. The outlet portion 150 includes an outlet passage 152 that extends from the second end surface 54 of the body 50 to the central chamber 58. The first end portion 30 of the fill tube 22 is connected to the outlet portion 150 by known means such as screw threads or a weld. The outlet passage 152 provides fluid communication between the central chamber 58 and the fill tube 22.

An electrically actuatable initiator 154 of a known construction is mounted on the second end 64 of the body 50 and projects into the central chamber 58. The initiator 154 is actuatable to actuate the inflator assembly 24. The vehicle 12 includes a sensor 160 (FIGS. 1 and 2) for sensing a collision or a rollover involving the vehicle and for actuating the inflator assembly 24 in response to the sensing of the collision or rollover. The sensor 160 may include a sensor and vehicle electric circuitry for actuating the inflator assembly 24 in response to sensing a vehicle acceleration or deceleration indicative of a vehicle collision having a severity greater than a predetermined threshold value. The sensor 160 provides an electric signal over lead wires 162 to the initiator, when the inflator assembly 24 is to be actuated.

In the event of an impact to the vehicle 18 of a magnitude greater than the predetermined threshold value or a vehicle rollover, the sensor 160 provides an electrical signal over the lead wires 162 to the initiator 154. The initiator 154 is actuated in a known manner to rupture the burst disk 84. The first inflation fluid 82 is released from the first fluid storage chamber 80 and flows into the central chamber 58.

The first inflation fluid 82 flows through the central chamber 58, through the outlet passage 152 and into the fill tube 22. The fill tube 22 directs the first inflation fluid 82 into the inflatable curtain 14. The inflatable curtain 14 is initially inflated by the first inflation fluid 82. The inflatable curtain 14 is inflated away from the vehicle roof 18 and into a position between a part of the vehicle 12 and an occupant of the vehicle. In the illustrated embodiment, the inflatable curtain 14 is inflated into a position between the side structure 16 of the vehicle 12 and the vehicle occupant.

As the first inflation fluid 82 flows into the central chamber 58, the fluid pressure in the central chamber 58 increases. The increasing fluid pressure in the central chamber 58 acts on the inner end portion 144 of the needle 136 and overcomes the biasing of the spring 134, causing the needle to move towards the rupturable portion 116 of the second vessel 44. The sharpened end portion 142 of the needle 136 moves into engagement with and ruptures the rupturable portion 116 of the second vessel 44. The second inflation fluid 124 flows from the second fluid storage chamber 122 to the central chamber 58 through the inflation fluid passage 140 in the needle 136. The second inflation fluid 124 is combined with the first inflation fluid 82 in the central chamber 58. The mixture of first and second inflation fluids 82 and 124 flows through the outlet passage 152 and the fill tube 22 and into the inflatable curtain 14.

When the first and second inflation fluids 82 and 124 are mixed together, the foaming agent of the first inflation fluid 82 reacts with the foam reactant of the second inflation fluid 124 to generate a low-density closed cell foam material. The closed cell foam material may be any suitable foam material, such as a polyurethane foam material or a polyester foam material. For example, if a polyurethane foam material is desired, the foaming agent of the first inflation fluid 82 would preferably be a polyether polyol, such as polyether glycol. The foaming agent could also include flame retardant and/or flame resistant ingredients. The foam reactant of the second inflation fluid 124 would preferably be an organic isocyanate, such as an aromatic isocyanate. An example of such an aromatic isocyanate is tolulene isocyanate.

The gas of the first and second inflation fluids 82 and 124 is an inert gas such as argon, nitrogen or carbon dioxide. The gas of the first and second inflation fluids 82 and 124 acts as a blowing agent that carries the foaming agent and foam reactant from the inflator assembly 24 into the inflatable curtain 14. The gas of the first and second inflation fluids 82 and 124 also fills the closed cells of the foam material generated by the reaction of the foaming agent and foam reactant.

As the foam material is generated in the inflatable curtain 14, the volume of the foam material increases. The combined first and second inflation fluids 82 and 124 continue to generate the foam material after the inflator assembly 24 stops propelling the inflation fluids into the inflatable curtain 14. The volume of the foam material continues to increase as the gas pressure in the inflatable curtain 14 drops. This helps to maintain the inflatable curtain 14 in an inflated condition throughout the duration of a vehicle collision and/or vehicle rollover. Also, as the foam material is produced by the reacting first and second inflation fluids 82 and 124, heat is generated, which may help to maintain the gas pressure in the inflatable curtain 14, and thus may help to maintain the curtain in an inflated condition. The inflatable curtain 14 is maintained in the inflated condition for at least four seconds.

From the above description of the invention, those skilled in the art will perceive improvements, changes and modifications in the invention. Such improvements, changes and modifications within the skill of the art are intended to be covered by the appended claims.

Having described the invention, we claim:

1. Apparatus for helping to protect an occupant of a vehicle, said apparatus comprising:

a vehicle occupant protection device that is inflatable into a position between a part of the vehicle and a vehicle occupant; and an inflation fluid source that is actuatable to direct into said vehicle occupant protection device both gas for initially inflating said vehicle occupant protection device and materials for forming a low-density closed cell foam material in said vehicle occupant protection device, said closed cell foam material assisting in maintaining said vehicle occupant protection device in an inflated condition.

2. Apparatus as defined in claim 1, wherein said inflation fluid source further comprises:

a first vessel that stores a pressurized agent material; and a second vessel that stores a pressurized reactant material;

said reactant material and said agent material being combined to form said low-density closed cell material when said inflation fluid source is actuated.

3. Apparatus as defined in claim 2, wherein said agent material is a polyether polyol and said reactant material is an organic isocyanate.

4. Apparatus as defined in claim 2, wherein said first vessel contains a pressurized first volume of gas, said first volume of gas initially inflating said vehicle occupant protection device and propelling said agent material into said vehicle occupant protection device when said inflation fluid source is actuated;

said second vessel containing a pressurized second volume of gas, said second volume of gas propelling said reactant material into said vehicle occupant protection device when said inflation fluid source is actuated.

5. Apparatus as defined in claim 1, wherein said low-density closed cell foam material is one of a polyurethane foam material and a polyester foam material.

6. Apparatus as defined in claim 1, wherein said vehicle occupant protection device remains inflated for at least four seconds.

7. Apparatus as defined in claim 6, wherein said vehicle occupant protection device is an inflatable curtain having a stored position extending along a side structure of the vehicle adjacent to a roof of the vehicle, said inflatable curtain being inflatable away from the vehicle roof into said position between the side structure of the vehicle and a vehicle occupant.

8. Apparatus as defined in claim 7, further including a fill tube having a portion located in said inflatable curtain, said inflation fluid source being in fluid communication with said fill tube, said inflation fluid source, when actuated, providing said gas and said materials for forming a low-density closed cell material to said fill tube, said fill tube directing said gas and said materials for forming a low-density closed cell material into said inflatable curtain to inflate said inflatable curtain.

9. Apparatus as defined in claim 1, further comprising a sensor for sensing a vehicle condition for which deployment of said inflatable curtain is desired, said sensor actuating said inflation fluid source to provide inflation fluid to inflate said inflatable curtain.

\* \* \* \* \*